United States Patent

[11] 3,556,118

[72] Inventor Charles J. Ahern
Sidney, N.Y.
[21] Appl. No. 728,179
[22] Filed May 10, 1968
[45] Patented Jan. 19, 1971
[73] Assignee The Bendix Corporation
a corporation of Delaware

[54] FLUIDIC SHIFT REGISTER

4 Claims, 2 Drawing Figs.

[52] U.S. Cl. .......... 137/81.5, 235/201
[51] Int. Cl. .......... F15c 1/12
[50] Field of Search .......... 137/81.5; 235/201

[56] References Cited

UNITED STATES PATENTS

| | | | |
|---|---|---|---|
| 3,348,773 | 10/1967 | Ahern | 235/201 |
| 3,331,381 | 7/1967 | Quigley, Jr. | 137/81.5 |
| 3,443,574 | 5/1969 | Posingies | 137/81.5 |

*Primary Examiner*—William R. Cline
*Attorneys*—William S. Thompson and Plante, Arens, Hartz and O'Brien

ABSTRACT: A shift register employing a three input AND element, the outputs of which may be used as controls of a conventional fluidic flip-flop. By using the three element AND gate, the power levels of the controls will be sufficiently high to switch the flip-flop in the presence of the trigger signal and will not be sufficient in the absence of the trigger. Additional power sources are, therefore, unnecessary.

Charles J. Ahern
INVENTOR.

BY

1

FLUIDIC SHIFT REGISTER

BRIEF SUMMARY OF INVENTION

This invention relates to fluidic devices having no moving parts and relates particularly to fluidic shift registers where information available in fluid pulse form is to be stored. The prior art shows that this storage may be made by setting the output of a bistable fluidic flip-flop and shows many schemes of getting this information to the flip-flop.

In those devices which wish to register the coincidence of two or more signals or combinations thereof, the prior art teaches the use of two passive AND gates to register the coincidence of either of two signals with a trigger or clock pulse signal. The output of the AND gate arrangement is then used to set the flip-flop. This has the drawback that there must be exact coincidence or the output of the AND gate may be insufficient to switch the flip-flop. Since the signals used by the AND gates are unamplified, they must be quite large or there would be the danger that the output of the AND gate would be insufficient to switch the flip-flop and anything less than exact coincidence would cause the output to be less than optimum. As successive passive elements are staged, their losses increase thereby heightening the problems of the AND element shift register.

The prior art also teaches the use of active OR gates to establish the occurrence of coincidence and then using the output of the OR gate to control switching of the flip-flop. This has the obvious disadvantage of requiring one or more additional sources of pressurized fluid. In light of the difficulties associated with these prior art devices, it is an object of the present invention to provide a shift register for fluid systems which has low power consumption and accuracy of operation. It is also an object of this invention to provide a shift register for fluid systems which can accept input signals of normal level and which does not require that these signals be amplified.

It is a further object of this invention to provide a fluid shift register to record the coincidence of fluidic pulse events which is inexpensive to manufacture and does not require perfect simultaneity of events. It is a further object of this invention to provide a fluidic shift register which will recognize as a coincidence of events, events having a small time delay between respective initiating fluid surges.

It is also an object of the invention to provide a multiple input AND gate adapted for use with a bistable flip-flop to form a simple and direct shift register for fluid systems.

These and other objects will be obvious to the man skilled in the art from the appended drawing and claims.

DETAILED DESCRIPTION

Figure 1:
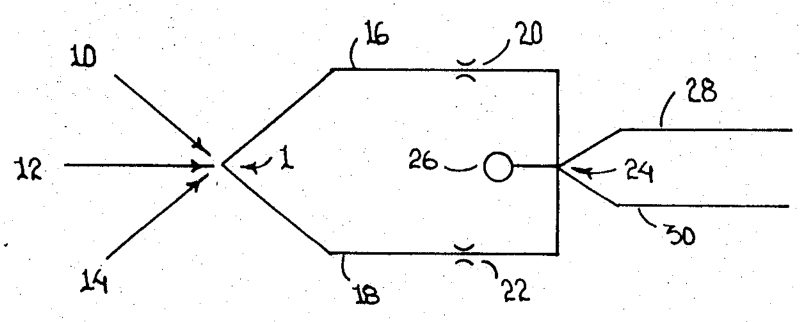
FIG. 1 is the fluidic circuit diagram of the device made according to the present invention.

Referring now to FIG. 1, the fluidic circuit is shown as having an input region 1 with three fluid inputs 10, 12, and 14. These inputs 10, 12, and 14 can combine to follow either of the flow paths 16 or 18. Shown in flow paths 16 and 18 are amplitude reducing means shown as flow restrictions 20 and 22. These flow restrictions 20 and 22 are used to represent any means which may be used to decrease the amplitude of any signals in flow paths 16 and 18.

Downstream of the restrictions 20 and 22 is a conventional bistable flip-flop shown generally as 24. The flip-flop 24 has a source of pressurized fluid 26 and tow output legs 28 and 30. The control for the flip-flop 24 is provided by the outlets of flow paths 16 and 18.

Figure 2:
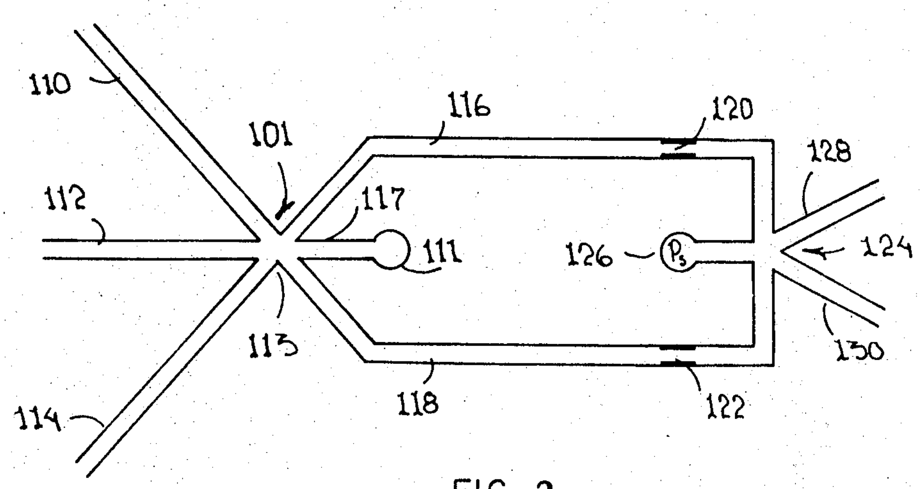
FIG. 2 is a schematic of one embodiment of a device having the circuit diagram of FIG. 1.

For a full understanding of my invention and referring to the specific embodiment of FIG. 2, the preferred embodiment of my device is set forth below. The numbering of the FIG. 2 embodiment corresponds to the numbering of the FIG. 1 circuit

2 wherever possible, but is in the 100 series of numbering. The input region 101 has three input passages 110, 112 and 114 which meet at a common interaction chamber 113. Disposed in a generally intercepting relationship with two of the input passages 110 and 114 are tow additional passages 116 and 118. A third passage 117 is also shown connecting the reaction region to a vent or fluid dump 111 to provide a flow path for any excess fluid which may tend to accumulate in the fluid interaction chamber 113.

The flip-flop 124 is a bistable device in which the information to be stored causes fluid flow from the input 126 to be channeled through one or the other of output passages 128 or 130. Input 126 is in communication with a source of fluid under pressure, $P_s$. The flip-flop 124 is controlled by fluid flow in passages 116 and 118, the outlets of which are arranged in the usual fashion on either side of the fluid stream issuing from inlet 126 and upstream of the output passages 128 and 130.

The passages 116 and 118 contain flow restrictions 120 and 122 which are operative to reduce the amplitude of any signals present in the passages 116 and 118. Since shift registers are used to record which of two possible conditions exist at a discrete time interval and at a specific point in the circuit, the restrictions are designed to reduce the level of the signal present in passages 116 and 118 below the switching level of the flip-flop 124 whenever that signal is merely the signal input in either of passages 110 or 114. Further, this reduction need only be sufficient to prevent the single signal from passage 110 or 114 from changing the state of the flip-flop by itself. Because of the particular use that shift registers have, the inputs 110 and 114 are mutually exclusive since each is selected to be the complement of the other. This means that whenever the system is in operation, there will be signal present in passages 110 and 118 or in passages 114 and 116. The addition of a clock pulse or other periodic input in passages 112 will, by momentum interchange with the existing signal, increase the signal in passages 116 or 118 at the discrete time intervals so that the reduction provided by the restrictions 120 and 122 will no longer be sufficient to prevent switching of the flip-flop. The man skilled in the art will recognize that the angular relationship of passages 116 and 118 to passages 110 and 114 can be varied to achieve optimum momentum transfer of the particular contemplated use.

OPERATION

Applicant's device is a new shift register which is useful for storing information concerning the state of a fluidic circuit at moments of time which are of interest to a user. The three-element AND gate portion 101 is adapted to receive signals via passages 110 and 114 indicative of the state of a fluidic system. The inputs for passages 110 and 114 would, in the usual mode of operation, be arranged to give signals for passages 110 and 114 which are mutually exclusive. That is, a signal would always be present in only one of the two passages. The signals received by passages 110 and 114 could by of any strength and would not need to be amplified. In fact, passages 110 and 114 could be connected directly to the circuit points of interest. This signal will be transmitted to the bistable device 124 through either of passages 116 and 118, depending upon which of the passages 110 and 114 the signal is present within. Due to the action of the restrictions 120 and 122, the strength signals transmitted from passages 110 and 114 will be reduced to a level which will prevent the signal from altering the status of, or condition of, the bistable element 124. The bistable element 124 will exhibit an output signal in either of passages 128 and 130 which signal will be indicative of the last recorded status of the fluidic system to which the applicant's device is attached. For instance, flow in passage 128 will be indicative of a signal in passage 112 at the instance of the most recent clock pulse in passage 112.

Passage 112 is connected to a source of a clock pulse or other periodic signal and this signal combined, through momentum transfer, with the signal which will be present in either of passages 110 and 114 will cause the strength of the signal received by the appropriate passage 116 or 118 to be substantially higher than the signal strength caused by signals in passages 110 and 114 without the clock pulse signal. This signal will be sufficiently strong so that strength reduction caused by the restriction 120 or 122 will not be sufficient to lower signal strength below the switching level of the bistable element 124. The coincidence of a clock signal with a signal in either of passages 110 and 114 will therefore set the output of the bistable to indicate in which of passages 110 and 114 the signal appeared when there was a substantially coincident clock signal pulse. Vent 111 is operative to exhaust excess fluid from region 101 as well as providing a fluid dump for extraneous fluid signals from passage 112.

Since the three input AND gate portion of the device utilizes momentum transfer principles, the angular relationship passages 110, 112, 114, 116 and 118 is of importance but may vary depending upon the expected momentum characteristics of the fluid used. This in turn will be controlled by the character of the fluid(s) and the velocity of signal propagation. The man of ordinary skill in the art will recognize these factors and will be able to determine, for his particular use, what the various angular relationships should be. Furthermore, the size of effect to be obtained by restrictions 120 and 122 will be determined by the strength of signals received by passages 110 and 114.

I claim:

1. A fluidic device comprising:

A fluid interaction region;

at least three fluid signal input passage means operative to introduce fluid into said interaction region;

fluid exhaust passage means arranged in an intercepting relation with said fluid input passages and operative to exhaust fluid from said interaction region;

said exhaust passage means so arranged as to intercept flow from a predetermined one and a predetermined combination of said input passage means;

flow restrictive means contained within said exhaust passage means selected to reduce fluid flow from said predetermined one of said input passage means to a level below the switching level of said bistable fluid element means, while flow from said predetermined combination of input passage means in reduced to a level above the switching level of said bistable fluid element means; and a bistable fluid element means having opposed control ports in communication with said exhaust passage means.

2. The fluidic device as

2. The device as claimed in claim 1, wherein said bistable fluid element means is a fluidic flip-flop.

3. A fluidic shift register comprising:

a fluid interaction chamber;

first, second, and third fluid input passage means in communication with said interaction region for introducing fluid input signals thereinto;

fourth passage means having an inlet port in said chamber and arranged to intercept fluid input signals discharged from said first passage means single or in combination with fluid input signals discharged from said second passage means;

fifth passage means having an inlet port in said chamber and spaced apart from said inlet to said fourth passage means;

said fifth passage means arranged to intercept fluid input signals discharged from said third passage means singly or in combination with fluid input signals discharged from said second passage means;

a bistable fluid element means having input means, control means, and output means;

a source of pressurized fluid in communication with said input means to produce a pressurized fluid output signal to said output means;

said fourth and fifth passage means in communication with said control means to selectively control the fluid output signals in said output means; and amplitude reducing means in said fourth and fifth passage means operative to reduce the amplitude of said fluid signals therein by an amount sufficient to reduce the amplitude of a single fluid input signal below the switching level of said bistable fluid element means while maintaining means while maintaining the amplitude of combined fluid input signals above the switching level of said bistable fluid element means has been inserted.

4. The shift register as claimed in claim 3 wherein said first and third input passage means are connected to mutually exclusive sources of fluid input signals and said second input passage means is connected to a source of periodic fluid input signals.